(12) United States Patent
Andrews

(10) Patent No.: US 9,908,208 B2
(45) Date of Patent: Mar. 6, 2018

(54) OFFSET PRESS FOR REMOVING WHEEL STUDS

(71) Applicant: Tiger Tool International Incorporated, Abbotsford (CA)

(72) Inventor: Michael Andrews, Bellingham, WA (US)

(73) Assignee: Tiger Tool International Incorporated, Abbotsford (CA)

( * ) Notice: Subject to any disclaimer, the term of this patent is extended or adjusted under 35 U.S.C. 154(b) by 0 days.

(21) Appl. No.: 14/605,321

(22) Filed: Jan. 26, 2015

(65) Prior Publication Data

US 2015/0209918 A1 Jul. 30, 2015

Related U.S. Application Data

(60) Provisional application No. 61/932,644, filed on Jan. 28, 2014.

(51) Int. Cl.
*B23P 19/04* (2006.01)
*B23P 19/02* (2006.01)

(52) U.S. Cl.
CPC ............. *B23P 19/04* (2013.01); *B23P 19/025* (2013.01); *Y10T 29/49822* (2015.01); *Y10T 29/49881* (2015.01); *Y10T 29/53691* (2015.01)

(58) Field of Classification Search
CPC .. B23P 19/04; B23P 19/025; Y10T 29/53691; Y10T 29/49881; Y10T 29/49822; B60B 23/08
USPC .......................................................... 29/252
See application file for complete search history.

(56) References Cited

U.S. PATENT DOCUMENTS

| 569,527 | A |  | 10/1896 | Tilton |
|---|---|---|---|---|
| 1,857,211 | A |  | 5/1932 | Odlum et al. |
| 2,036,782 | A | * | 4/1936 | Ullmo ............... B25B 27/062 29/263 |
| 2,052,534 | A |  | 8/1936 | Quarles |
| 2,484,129 | A |  | 10/1949 | Taylor |
| 2,549,429 | A |  | 4/1951 | Cowles |

(Continued)

FOREIGN PATENT DOCUMENTS

CA 2880139 A1 * 7/2015 ............. B23P 19/04

OTHER PUBLICATIONS

OTC, "Wheel Stud Remover/Installer," Product Brochure, 2009, 1 page, Product No. 5195.

(Continued)

*Primary Examiner* — Marc Carlson
(74) *Attorney, Agent, or Firm* — Michael R. Schacht; Schacht Law Office, Inc.

(57) ABSTRACT

A press for displacing a first wheel stud relative to a stud opening in a wheel flange of a wheel comprises a press assembly, a frame assembly, and a drive assembly. The frame assembly comprises a frame member and at least one adapter member. The drive assembly is configured to displace the press assembly relative to the frame assembly such that operation of the drive assembly displaces the first stud relative to the wheel flange. The adapter member is supported by the frame member and engages at least one of the wheel flange and a second wheel stud to support the press assembly in a desired orientation relative to the primary wheel stud when the drive assembly displaces the first stud relative to the stud opening.

18 Claims, 18 Drawing Sheets

(56) References Cited

U.S. PATENT DOCUMENTS

| | | | |
|---|---|---|---|
| 2,798,392 A | 7/1957 | Randolph | |
| 3,102,333 A | 9/1963 | Thornton et al. | |
| 3,200,483 A | 8/1965 | Menegoni | |
| 3,237,291 A | 3/1966 | Kelso | |
| 3,742,570 A | 7/1973 | Felser | |
| 3,862,483 A * | 1/1975 | Kloster | B25B 27/023 29/257 |
| 4,363,475 A * | 12/1982 | McCarty | B25B 5/006 269/101 |
| 4,398,706 A | 8/1983 | Kaulfuss | |
| 4,624,039 A | 11/1986 | Lawrence et al. | |
| 4,648,166 A | 3/1987 | Tilman | |
| 4,672,731 A * | 6/1987 | Taylor | B25B 27/023 29/259 |
| 4,765,057 A * | 8/1988 | Muller | B23P 19/062 227/119 |
| 4,770,401 A | 9/1988 | Donaldson | |
| 4,771,528 A * | 9/1988 | Stromberg | B25B 27/023 29/259 |
| 4,867,366 A * | 9/1989 | Kleinholz | B25C 1/044 173/210 |
| 4,940,370 A | 7/1990 | Gipson | |
| 4,976,280 A | 12/1990 | Lagana | |
| 5,125,324 A * | 6/1992 | Araki | B25B 27/10 269/238 |
| 5,210,919 A | 5/1993 | Garman | |
| 5,211,211 A | 5/1993 | Rubino et al. | |
| 5,233,741 A | 8/1993 | Maynard | |
| 5,257,445 A | 11/1993 | Mayberry | |
| 5,271,136 A | 12/1993 | Skoworodko | |
| 5,519,929 A * | 5/1996 | Bleckman | B25B 27/023 29/264 |
| 5,586,378 A * | 12/1996 | Smith | B25B 27/023 269/249 |
| 5,606,788 A | 3/1997 | Rubino et al. | |
| 5,692,437 A | 12/1997 | Tabain | |
| 5,839,180 A * | 11/1998 | Hochmiller | B25B 27/026 29/252 |
| 5,898,985 A | 5/1999 | Villarreal | |
| 6,192,566 B1 * | 2/2001 | Dunum | B25B 27/0035 29/233 |
| 6,505,390 B2 * | 1/2003 | Emanuel | B25B 27/023 29/257 |
| 6,618,920 B1 * | 9/2003 | Emanuel | B25B 27/023 29/257 |
| 6,789,791 B2 | 9/2004 | Genduso | |
| 7,020,944 B2 | 4/2006 | Klann | |
| 7,093,809 B2 | 8/2006 | Hwang | |
| 7,219,885 B2 | 5/2007 | Nardozza | |
| 7,387,296 B2 | 6/2008 | Alberti | |
| 7,818,860 B2 | 10/2010 | Hume et al. | |
| 7,891,084 B1 * | 2/2011 | Sollami | B28D 1/188 29/426.5 |
| 8,689,420 B2 | 4/2014 | Barrios et al. | |
| 9,751,199 B2 | 9/2017 | Andrews | |
| 2001/0029655 A1 * | 10/2001 | Emanuel | B25B 27/023 29/426.5 |
| 2003/0084555 A1 | 5/2003 | Meggiolan | |
| 2003/0106197 A1 | 6/2003 | Emanuel | |
| 2005/0071973 A1 * | 4/2005 | Emanuel | B25B 27/023 29/257 |
| 2006/0070221 A1 | 4/2006 | Wridt et al. | |
| 2008/0289841 A1 * | 11/2008 | Kang | B25B 27/06 173/48 |
| 2009/0025514 A1 * | 1/2009 | Barrios | B25B 27/023 81/53.2 |
| 2010/0000749 A1 * | 1/2010 | Andel | B25B 21/026 173/48 |
| 2010/0236039 A1 * | 9/2010 | Robledo | B23P 19/04 29/256 |
| 2011/0048649 A1 * | 3/2011 | Komatsu | B23P 19/069 157/1.35 |
| 2011/0094076 A1 * | 4/2011 | Liu | B25B 27/02 29/244 |
| 2011/0219617 A1 * | 9/2011 | Barrios | B25B 27/0035 29/894.3 |
| 2013/0026692 A1 | 1/2013 | Prins | |
| 2014/0366954 A1 * | 12/2014 | Miller | B65D 90/00 137/15.11 |
| 2015/0183268 A1 * | 7/2015 | Baldassara | B60B 25/20 301/11.2 |
| 2015/0209918 A1 * | 7/2015 | Andrews | B23P 19/04 29/456 |

OTHER PUBLICATIONS

OTC, "Wheel Stud Service Kit," Product Brochure, 2012, 1 page, Product No. 4295.
Toyota, "4Runner Repair Manual, Inspection and Repair of Front Axle Hub" 1990, pp. 1 and SA-18, vol. 2, Publication No. RM143U2.
United States Patent and Trademark Office, Office Action Summary, dated May 3, 2017, 10 pages, Alexandra, Virginia.

* cited by examiner

OFFSET PRESS FOR REMOVING WHEEL STUDS

RELATED APPLICATIONS

This application, U.S. patent application Ser. No. 14/605,321 filed Jan. 26, 2015 claims benefit of U.S. Provisional Application Ser. No. 61/932,644 filed Jan. 28, 2014, the contents of which are incorporated herein by reference.

TECHNICAL FIELD

The present invention relates to systems and methods for removing the wheel studs from a wheel.

BACKGROUND

Wheels for large mining vehicles employ multiple wheel studs to bear the loads carried by such vehicles. The wheel studs are inserted through a wheel flange and are adjacent to a wheel cylinder. Wheel studs often need replacement during maintenance of wheel. For certain high capacity wheels, the wheel studs are arranged very close to each other and to the wheel cylinder. The use of conventional removal tools such as hammers is difficult and can result in damage to the wheel.

The need thus exists for systems and methods for pressing wheel studs out of the holes in the flange of a wheel that are easy and quick to use and minimize the likelihood of damage to the wheel.

SUMMARY

The invention may be embodied as a press for displacing a first wheel stud relative to a stud opening in a wheel flange of a wheel comprises a press assembly, a frame assembly, and a drive assembly. The frame assembly comprises a frame member and at least one adapter member. The drive assembly is configured to displace the press assembly relative to the frame assembly such that operation of the drive assembly displaces the first stud relative to the wheel flange. The adapter member is supported by the frame member and engages at least one of the wheel flange and a second wheel stud to support the press assembly in a desired orientation relative to the primary wheel stud when the drive assembly displaces the first stud relative to the stud opening.

The present invention may also be embodied as a press for displacing wheel studs relative to stud openings in a wheel flange of a wheel, the press comprising a press assembly, a frame assembly, and a drive assembly. The frame assembly comprises a frame member, first and second hole spacers, first and second stud spacers, a removal plate, and an insertion plate. The drive assembly configured to displace the press assembly relative to the frame assembly such that operation of the drive assembly displaces the first stud relative to the wheel flange. The press operates in a first mode using the first and second stud spacers to remove one of the wheel studs, a second mode using the first stud spacer and the first hole spacer to remove at least one of the wheel studs, a third mode using the removal plate to remove at least one of the wheel studs, and a fourth mode using the insertion plate to insert at least one of the wheel studs.

The present invention may also be embodied as a method of displacing wheel studs relative to stud openings in a wheel flange of a wheel, the method comprising the following steps. A frame assembly comprising a frame member and at least one hole spacer is provided. At least one stud spacer, a removal plate, and an insertion plate are provided. The press assembly is supported for linear movement relative to the frame member. A drive assembly is arranged to displace the press assembly relative to the frame assembly such that operation of the drive assembly displaces the first stud relative to the wheel flange. The press is operated in at least one of a first mode using the at least one stud spacer to remove one of the wheel studs, a second mode using the at least one stud spacer and the at least one hole spacer to remove at least one of the wheel studs, a third mode using the removal plate to remove at least one of the wheel studs, and a fourth mode using the insertion plate to insert at least one of the wheel studs.

DETAILED DESCRIPTION

Figure 1:
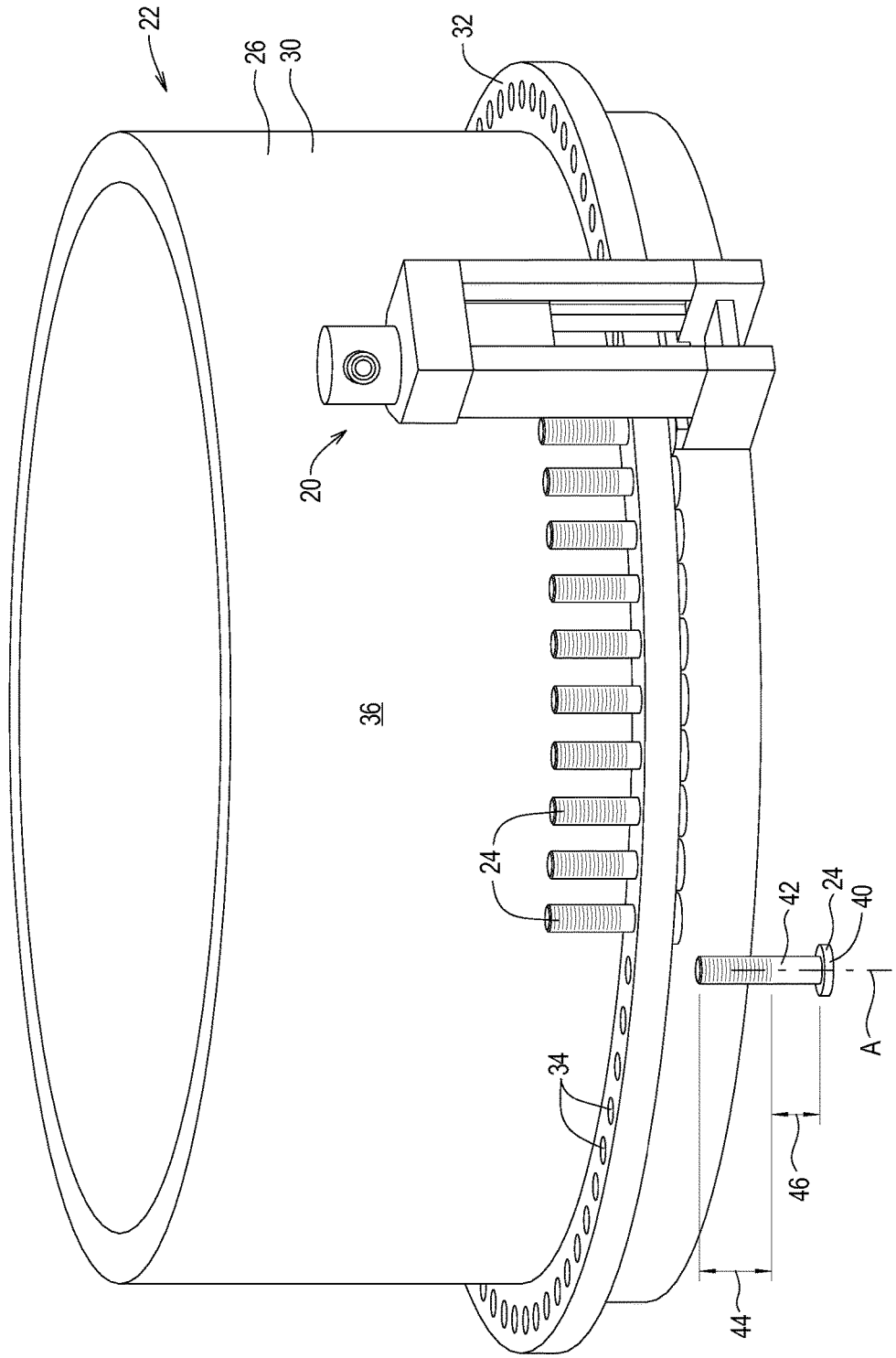
FIG. 1 is a perspective view of an example wheel and wheel studs and an example offset press assembly for inserting and/or removing the wheel studs from the wheel.
Figure 2:
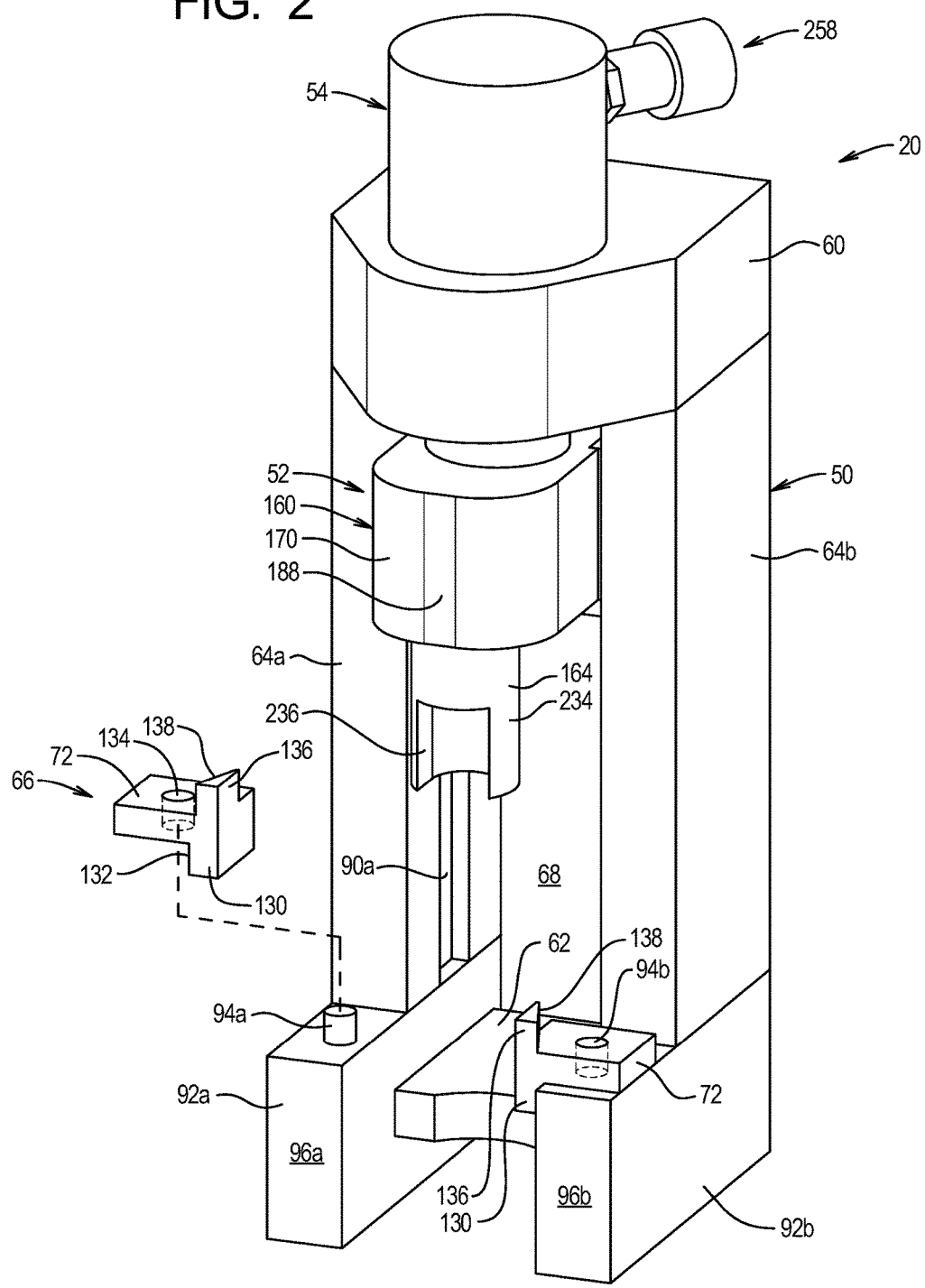
FIG. 2 is a perspective view of the example offset press assembly being arranged in a first removal configuration.
Figure 3:
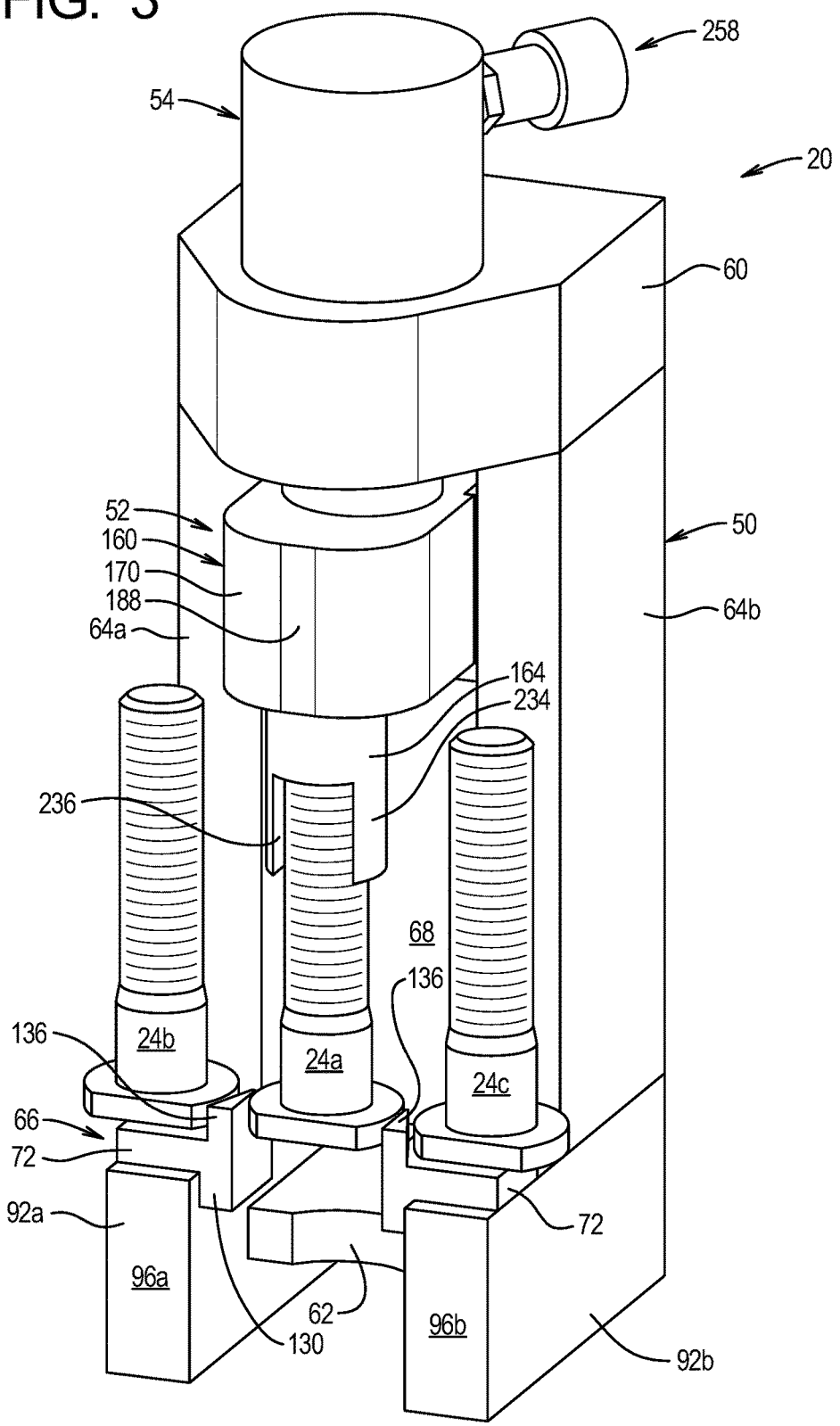
FIG. 3 is a perspective view of the example offset press assembly being used in the first removal configuration.
Figure 4:
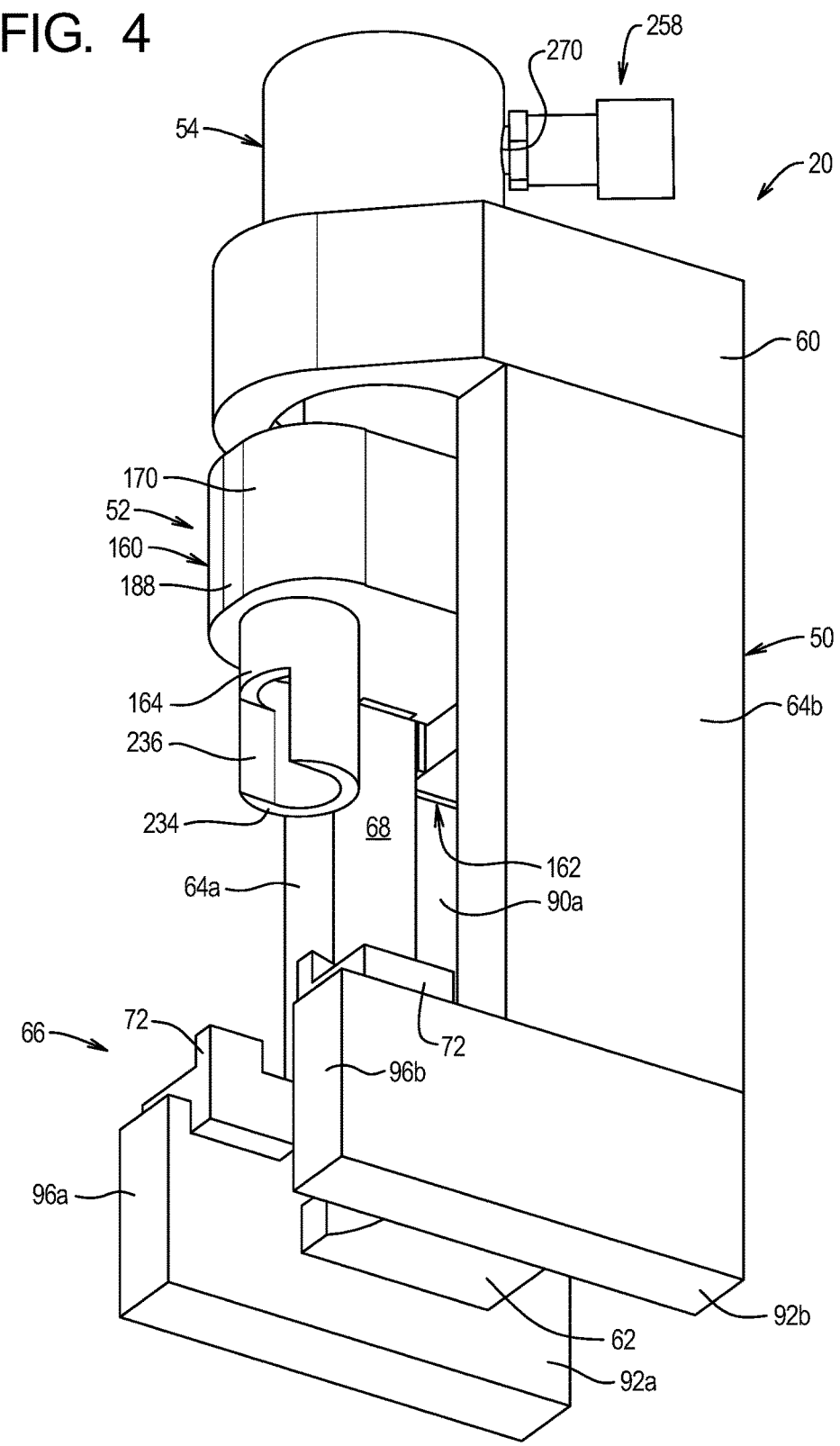
FIG. 4 is a perspective view of the example offset press assembly being used in a loading arrangement of the first removal configuration.
Figure 5:
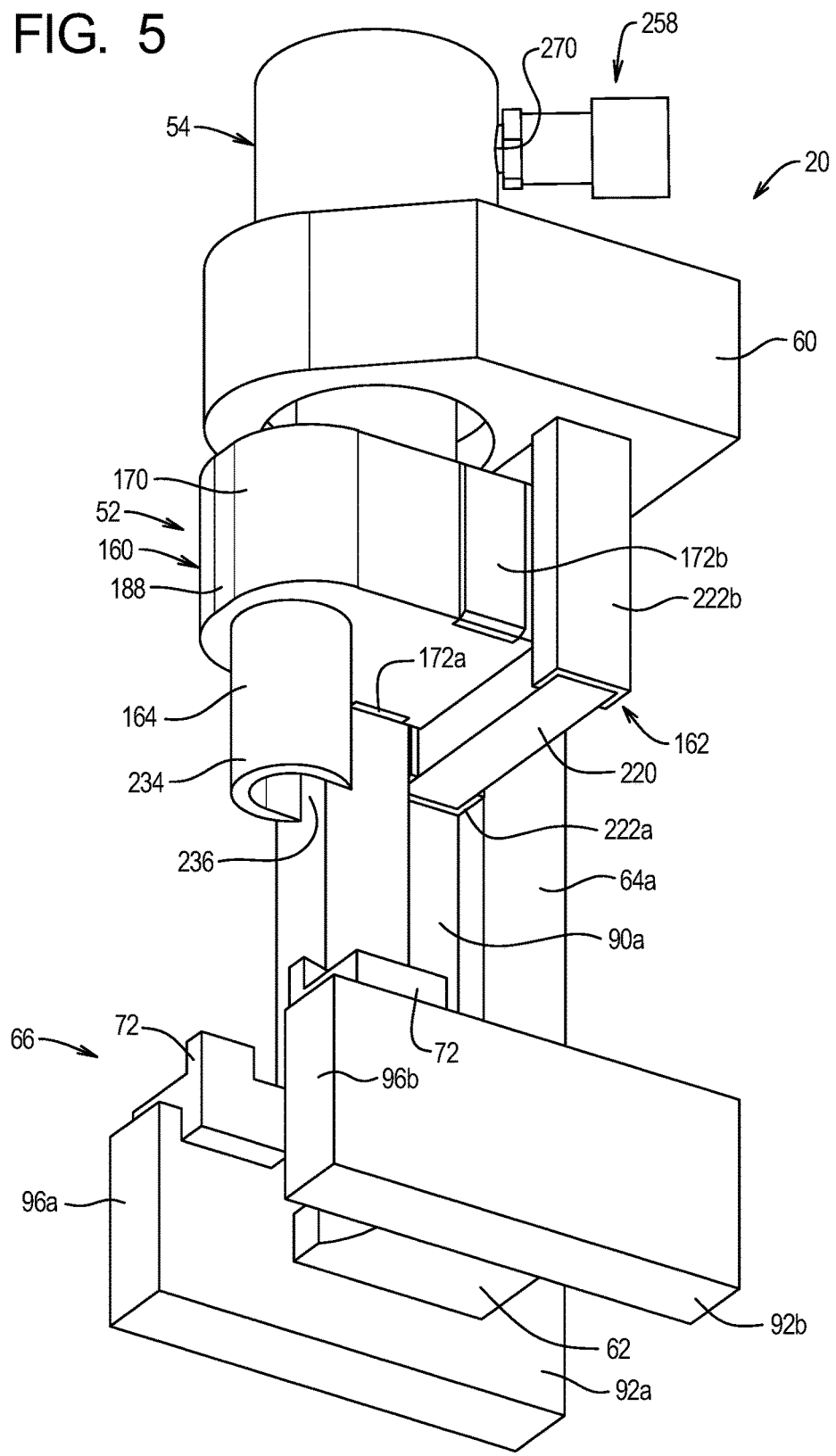
FIG. 5 is a perspective view of the example offset press assembly being used in a loaded arrangement of the first removal configuration.
Figure 6:
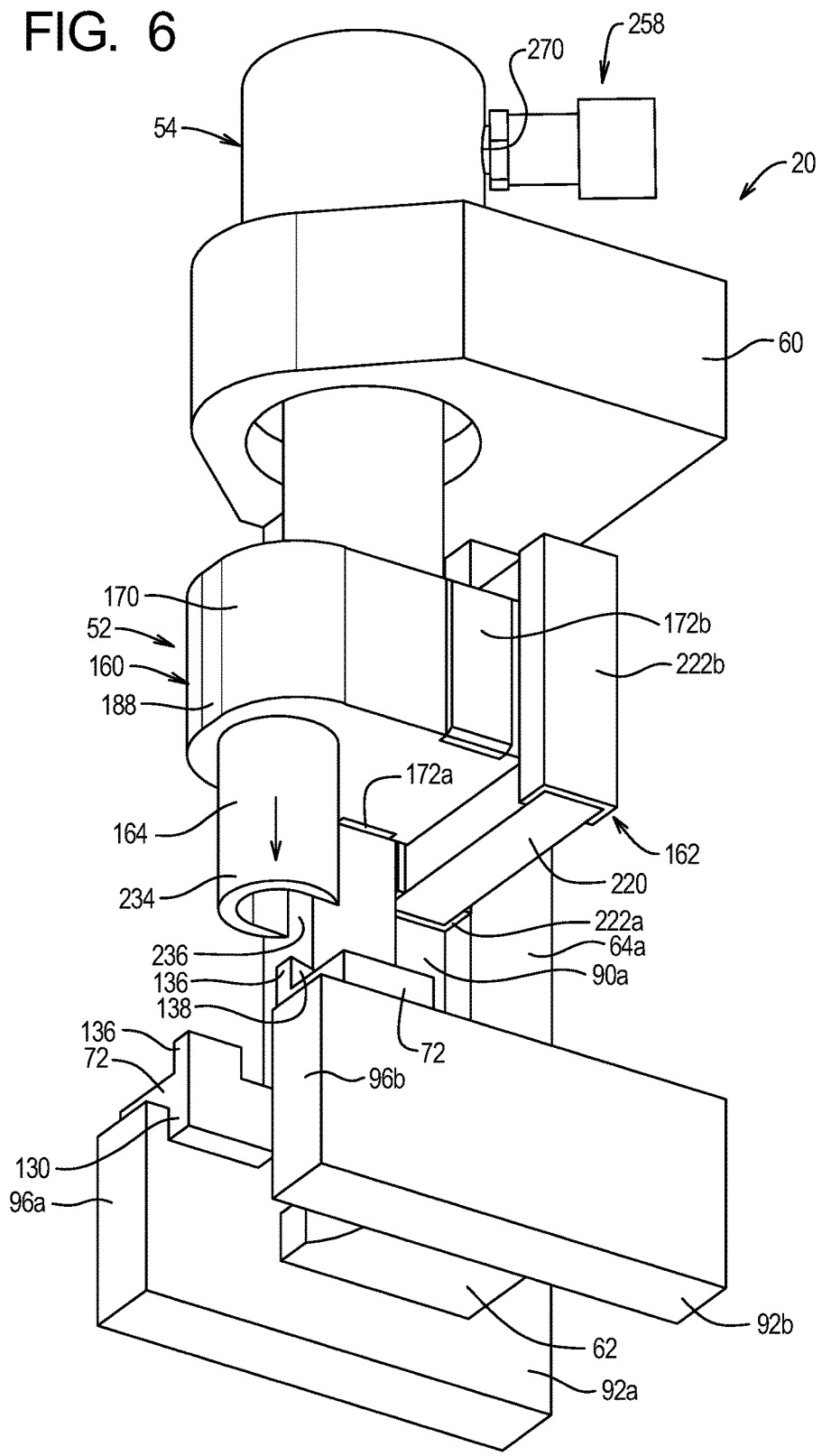
FIG. 6 is a perspective view of the example offset press assembly being used in the loaded arrangement of the first removal configuration.
Figure 7:
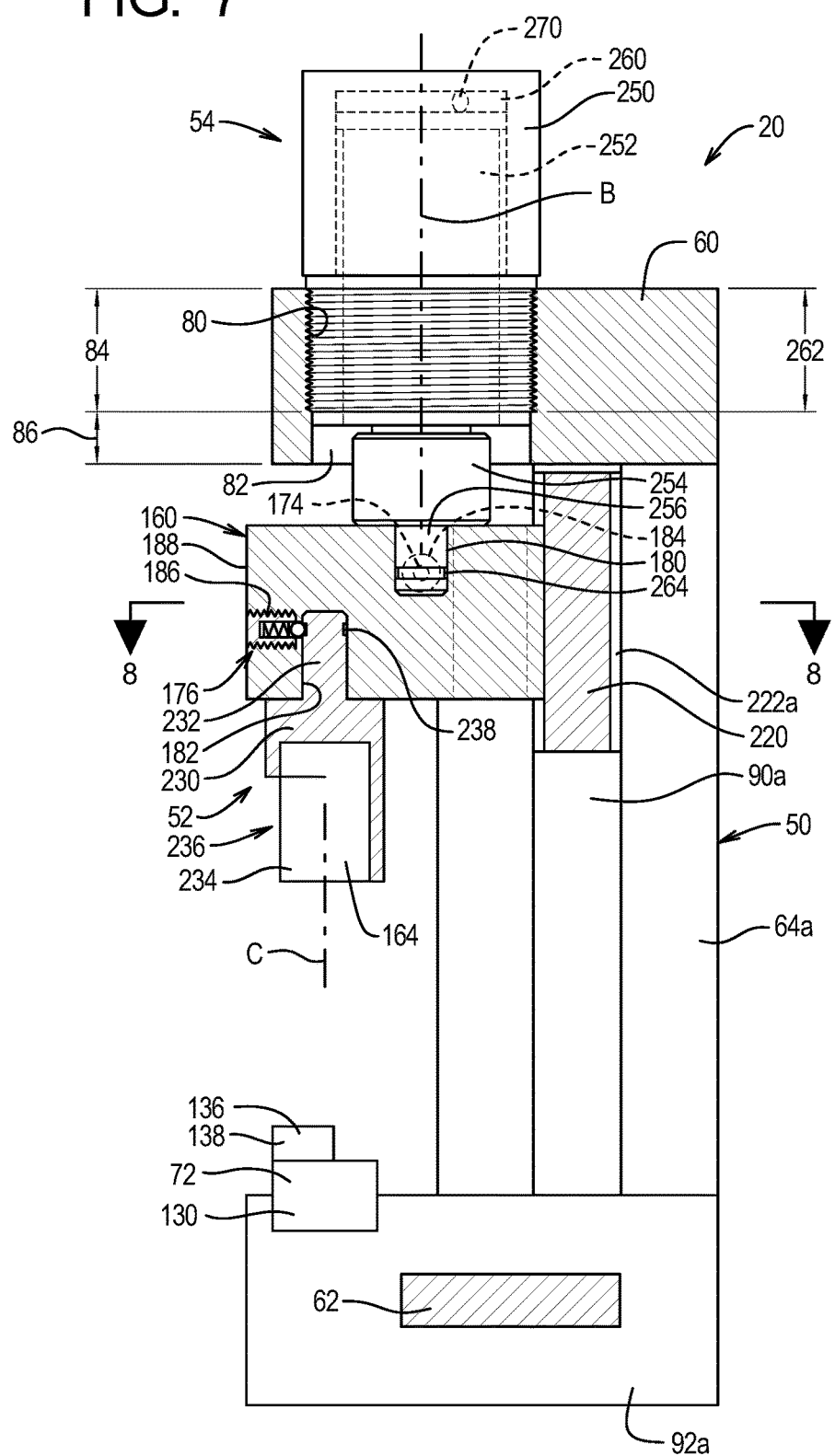
FIG. 7 is a side, partial cut-away view depicting the example offset press assembly in the loading configuration of the first removal configuration.

Referring initially to FIG. 1 of the drawing, depicted therein is an offset press assembly 20 for use with a wheel assembly 22. The example wheel assembly 22 comprises wheel studs 24 and a wheel 26. The example offset press assembly 20 may be used in one or more removal configurations to remove the wheel studs 24 from the wheel 26 or in one or more insertion configurations to insert the wheel studs 24 into the wheel 26. In the following discussion, the reference character "24" will be used without a letter suffix to refer to any one of the wheel studs depicted in the drawings. In some cases, the reference character "24" will be used with letter suffixes to identify specific wheel studs when such identification is desirable.

The example wheel assembly 22 is a mining wheel assembly adapted to attach a tire (not shown) to a mining truck axle (also not shown). The example wheel assembly 22 is not per se part of the present invention and will be described herein only to that extent necessary for a complete understanding of the present invention. The example wheel assembly 26 comprises a wheel cylinder 30 and a wheel flange 32, and stud openings 34 are formed at evenly spaced intervals around the wheel flange 32. The wheel cylinder 30 of such wheel assemblies is typically longer than the wheel studs 24 when in place in the openings 34 in the flange 32. The stud openings 34 are typically spaced close to the outer surface 36 of the wheel cylinder 30.

Figure 9:
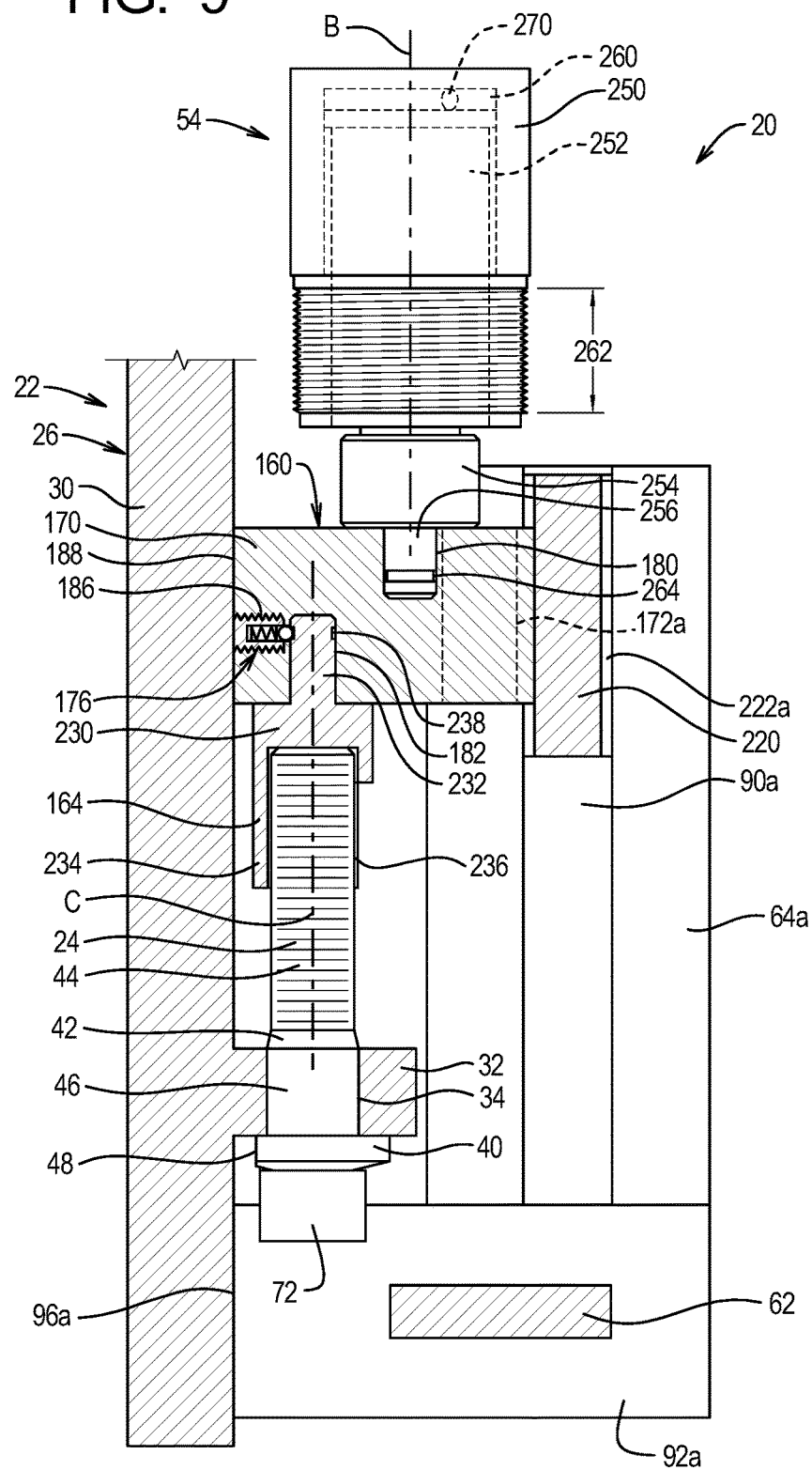
FIG. 9 a side, partial cut-away view depicting the example offset press assembly being used in the loaded configuration of the first removal configuration to remove a wheel stud from the wheel.

In the example wheel assembly 26, the example wheel flange 32 extends outwardly from an exterior surface 36 of the wheel cylinder 30. The example wheel flange 32 is also longitudinally aligned with the wheel cylinder 30. As perhaps best shown in FIG. 9, the wheel studs 24 each define a stud axis A and comprise a head 40 and a shaft 42. The shaft 42 defines a shaft threaded portion 44 and a shaft unthreaded portion 46. The head 40 of the example wheel studs 24 is notched as shown at 48 in FIG. 9 to prevent the head 40 from engaging the wheel cylinder 30 during installation, removal, and use. The stud openings 34 have a diameter that approximately matches a diameter of the shaft unthreaded portions 46.

The example wheel assembly 22 is of the type commonly used on mining trucks. To form the example wheel assembly 22, one of the wheel studs 24 must be driven through each of the stud openings 34 until the unthreaded portion 46 of the shaft 42 engages the portion of the wheel flange 32 defining the stud openings 34 to form a friction fit. The wheel studs 24 must be removed and replaced when broken and/or during periodic maintenance of the wheel assembly 22, and such removal and replacement is typically performed in the field. In the field, such removal and replacement is typically accomplished using a sledge hammer. The removal and replacement process is thus strenuous and time-consuming.

The example offset press assembly 20 is designed to mechanize the process of removing and inserting wheel studs 24 from a wheel 26, and greatly simplifies the process of removing and inserting such wheel studs 24 in the field. The example offset press assembly 20 comprises a frame assembly 50, a press assembly 52, and a drive assembly 54. As will be apparent from the following discussion, the example frame assembly 50 is a rigid member adapted to engage the wheel flange 32 while a force is applied on the wheel studs 24 to either insert the wheel studs 24 into or remove the wheel studs 24 from the stud openings 34. The exact details of construction of the frame assembly 50 are not critical to any particular implementation of the present invention so long as the frame assembly functions to hold the various components of the offset press assembly in position during use of the offset press assembly 20 as will be described herein in detail below.

The example frame assembly 50 comprises a top plate 60, a bottom plate 62, side walls 64a and 64b, and an adapter system 66. The top plate 60 and bottom plate 62 are rigidly connected to, or may be integrally formed with (e.g., casting), the side walls 64a and 64b such that the side walls 64a and 64b are substantially parallel to each other and the frame assembly 50 defines a clearance slot 68 between the walls 64a and 64b.

Figure 21:
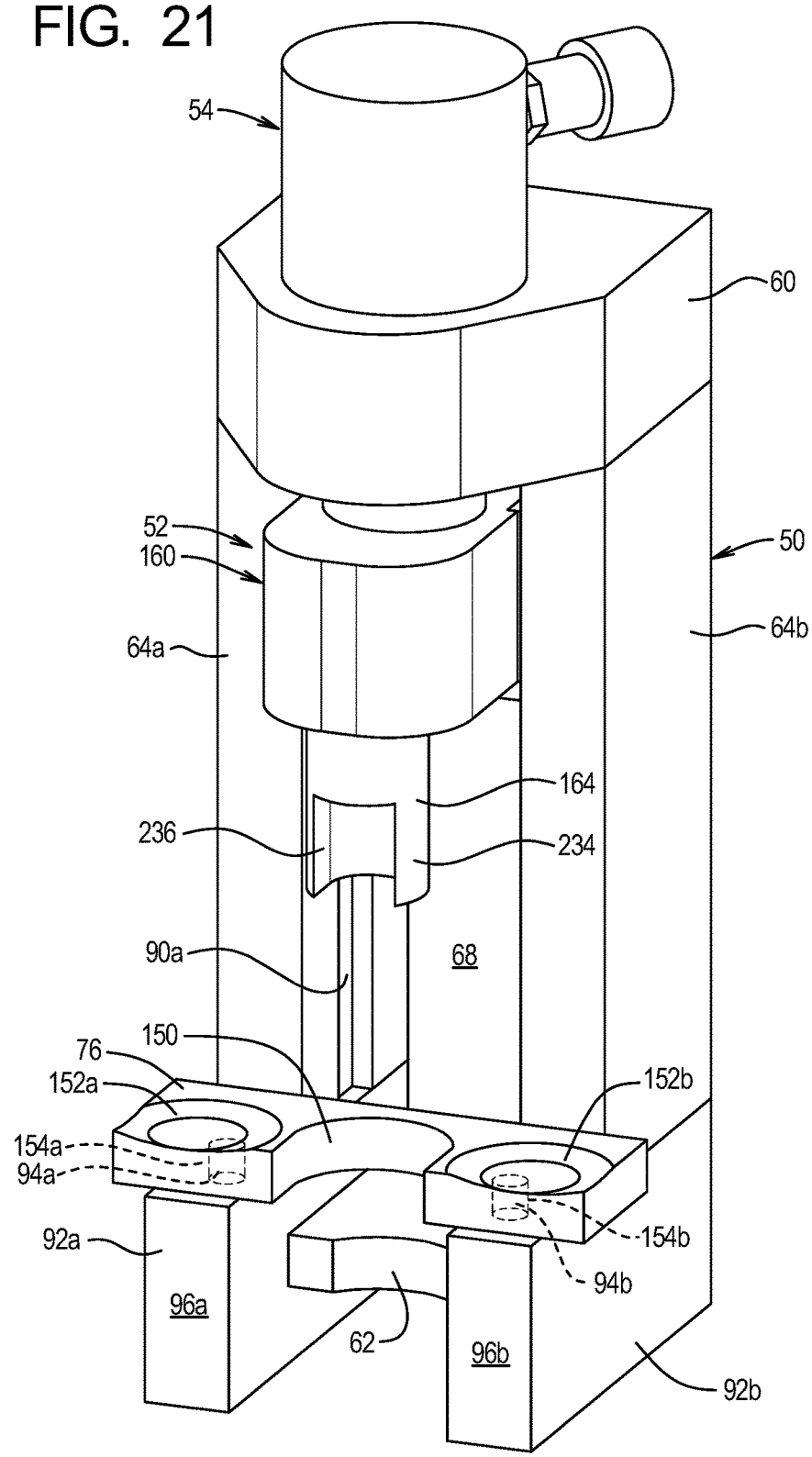
FIG. 21 is a perspective view of the example offset press assembly in a loading arrangement of a fourth removal configuration.
Figure 22:
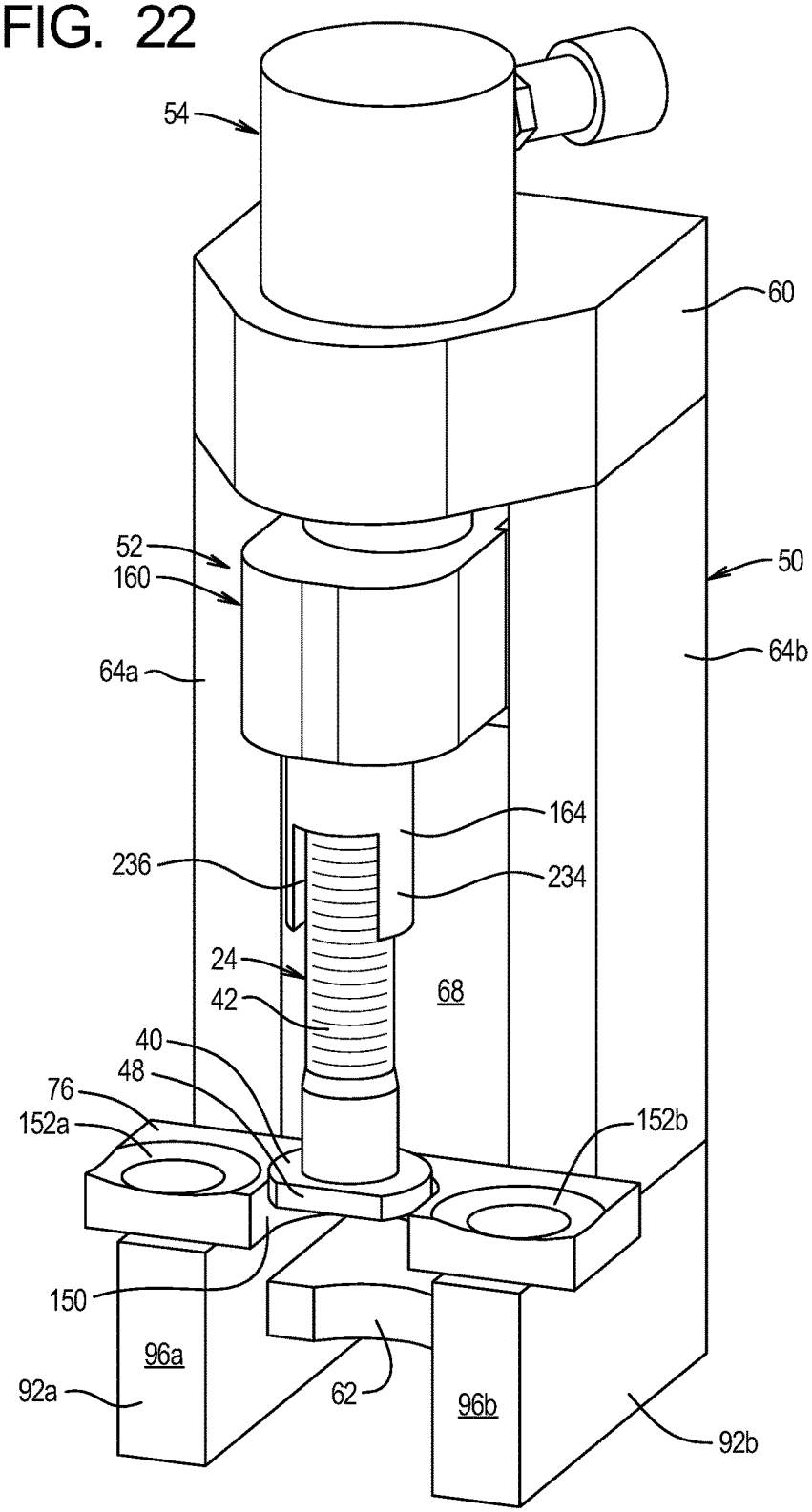
FIG. 22 is a front elevation view depicting the example offset press assembly being used in a loaded configuration of the fourth removal configuration to remove a wheel stud from a wheel (not shown).

The example adapter system 66 comprises a variety of components supported by the frame assembly 50 in various configurations to allow the example offset press assembly 20 to be used in various operating environments. In particular, the example adapter system 66 comprises one or more hole spacers 70 (FIGS. 12-16), one or more stud spacers 72 (FIGS. 2-7 and 11-14), an insertion brace plate 74 (FIGS. 16-20), and a removal brace plate 76 (FIGS. 21 and 22). The adapter system 66 allows the offset press assembly 20 to be used in a first removal configuration (FIGS. 2-11), a second removal configuration (FIGS. 12-14), a third removal configuration (FIG. 15), a first insertion configuration (FIGS. 16-20), and a fourth removal configuration (FIGS. 21 and 22). The example offset press assembly 20 may further be used in a loading arrangement (FIGS. 4, 7, 13, and 21) and/or in an unloaded arrangement (FIGS. 5, 6, 9-11, 14, 15, and 22) in any of the insertion configurations.

Referring now for a moment back to the frame assembly 50, the top plate 60 comprises an inner surface 80 defining a drive opening 82. The inner surface 80 comprises a threaded portion 84 and an unthreaded portion 86. The first and second side walls 64a and 64b define guide slots 90a and 90b, respectively. The guide slots 90a and 90b are arranged on opposing sides of the clearance slot 68. The first and second side walls 64a and 64b further define first and second foot portions 92a and 92b, respectively. First and second adapter projections 94a and 94b extend from the first and second foot portions 92a and 92b, respectively. Foot guide surfaces 96a and 96b are defined by the first and second foot portions 92a and 92b, respectively.

The hole spacers 70 each comprise a foot alignment projection 120 defining a foot alignment surface 122. An adapter hole 124 is formed in each of the hole spacers 70. The stud spacers 72 each comprise a foot alignment projection 130 defining a foot alignment surface 132. An adapter hole 134 is formed in each of the stud spacers 72. A stud alignment projection 136 defining a stud alignment surface 138 extends from each stud spacer 72. The insertion brace plate 74 defines a center stud recess 140 and a pair of side stud recesses 142a and 142b. Adapter holes 144a and 144b are formed in each insertion brace plate 74. The removal brace plate 76 defines a stud notch 150 and a pair of side stud recesses 152a and 152b. Adapter holes 154a and 154b are formed in each removal brace plate 76. The adapter holes 124, 134, 144, and 154 are sized and dimensioned to snugly receive the adapter projections 94a and 94b. The adapter holes 144a and 144b are spaced from each a distance equal to that between the adapter projections 94a and 94b. The adapter holes 154a and 154b are also spaced from each a distance equal to that between the adapter projections 94a and 94b.

The example press assembly 52 comprises a press plate assembly 160, a guide plate assembly 162, and a removal head 164 when the offset press assembly 20 is operating in a removal configuration and an insertion head 166 when the offset press assembly is operating in an insertion configuration. The example press plate assembly 160 comprises a press plate 170, first and second bumper plates 172a and 172b, a first lock assembly 174, and a second lock assembly 176. The example press plate 170 comprises a main drive cavity 180 defining a main drive axis B, an offset drive cavity 182 defining an offset drive axis C, a first lock cavity 184, a second lock cavity 186, and a wheel guide surface 188. The first and second lock cavities 184 and 186 both define internal threaded surfaces.

The first and second lock assemblies 174 and 176 are arranged within the first and second lock cavities 184 and 186, respectively. The example lock assemblies 174 and 176 function to allow the press assembly 52 to be detachably attached to the drive assembly 54 and the removal heads 164 and insertion heads 166 to detachably attached to the press assembly 52. The example lock assemblies 174 and 176 may be identical or may differ in size and construction. Accordingly, only the second example lock assembly 176 will be described herein in detail.

Figure 10:
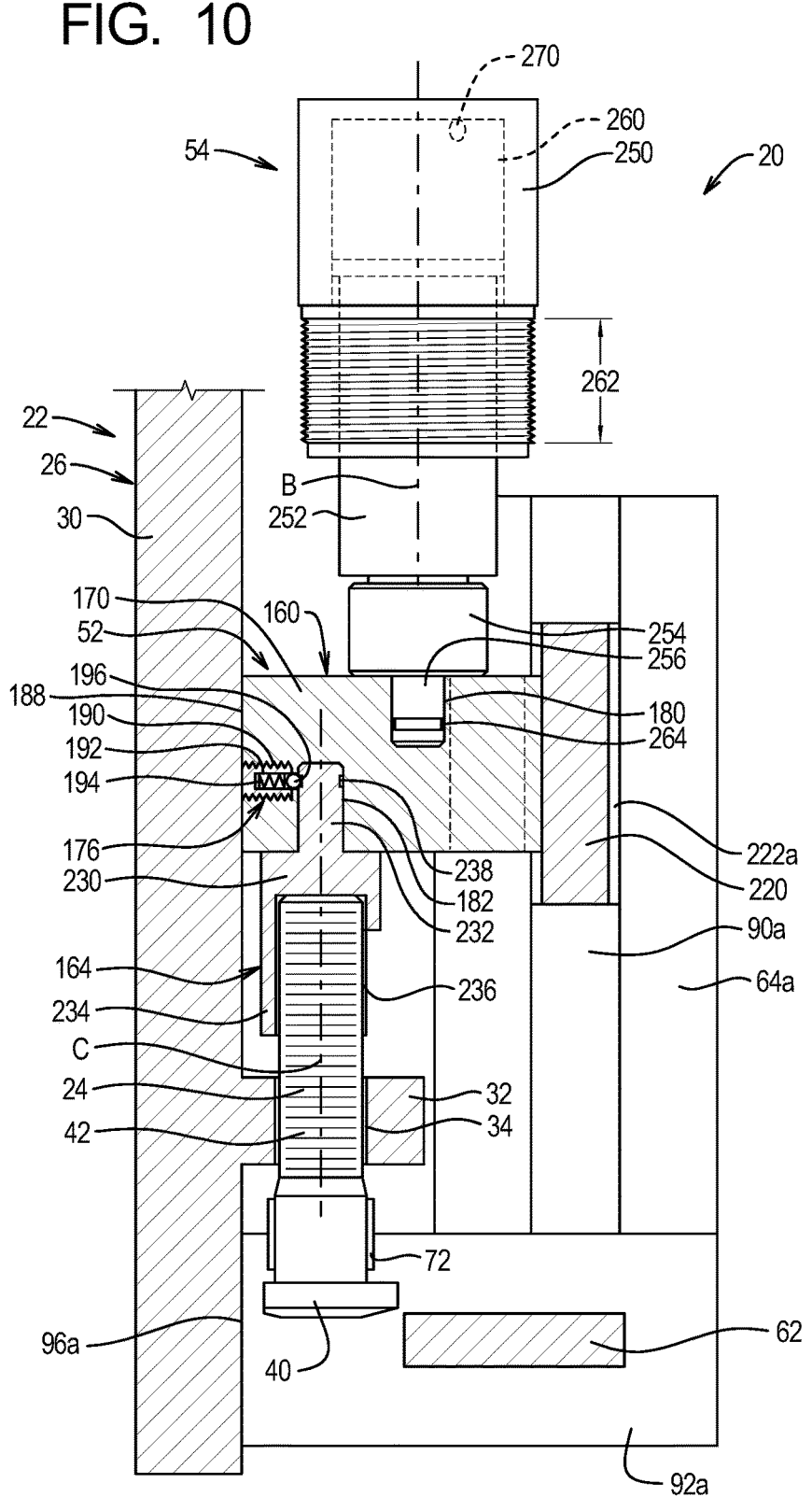
FIG. 10 a side, partial cut-away view depicting the example offset press assembly being used in the loaded configuration of the first removal configuration to remove a wheel stud from the wheel.
Figure 11:
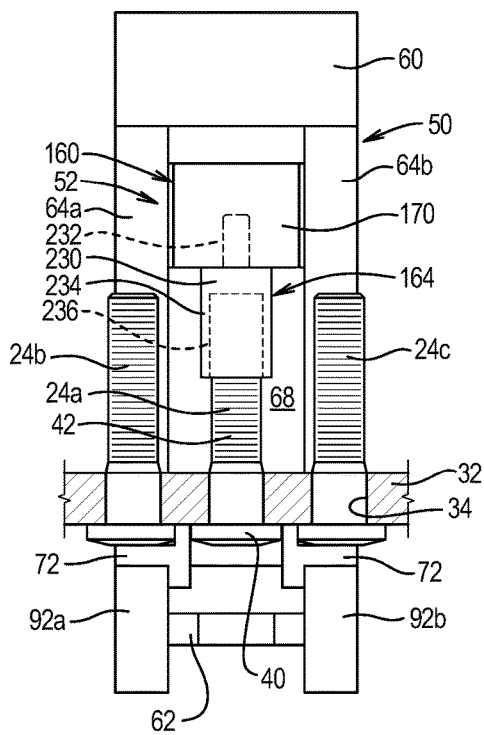
FIG. 11 a front elevation view depicting the example offset press assembly in the loaded configuration of the first removal configuration.

As shown in FIG. 10, the second example lock assembly 176 comprises a set screw 190 defining a set screw cavity 192, a detent spring 194, and a detent ball 196. The outer surface of the set screw 190 is threaded to be received by a complementary threaded surface on the second detent cavity 186. The detent spring 194 is arranged within the set screw cavity 192, and the detent ball 196 is then arranged at least partly within the set screw cavity 192 such that the detent spring 194 biases the detent ball out of the set screw cavity 192. However, deliberate application of manual force on the detent ball 196 against the force of the detent spring 194 allows the detent ball 196 to be displaced completely into the set screw cavity 192. Accordingly, when the example lock assemblies 174 and 176 are threaded into the corresponding lock cavities 184 and 186, at least a portion of the detent balls of the lock assemblies 174 and 176 extends partly into the main drive cavity 180 and offset drive cavity 182, respectively.

Figure 8:
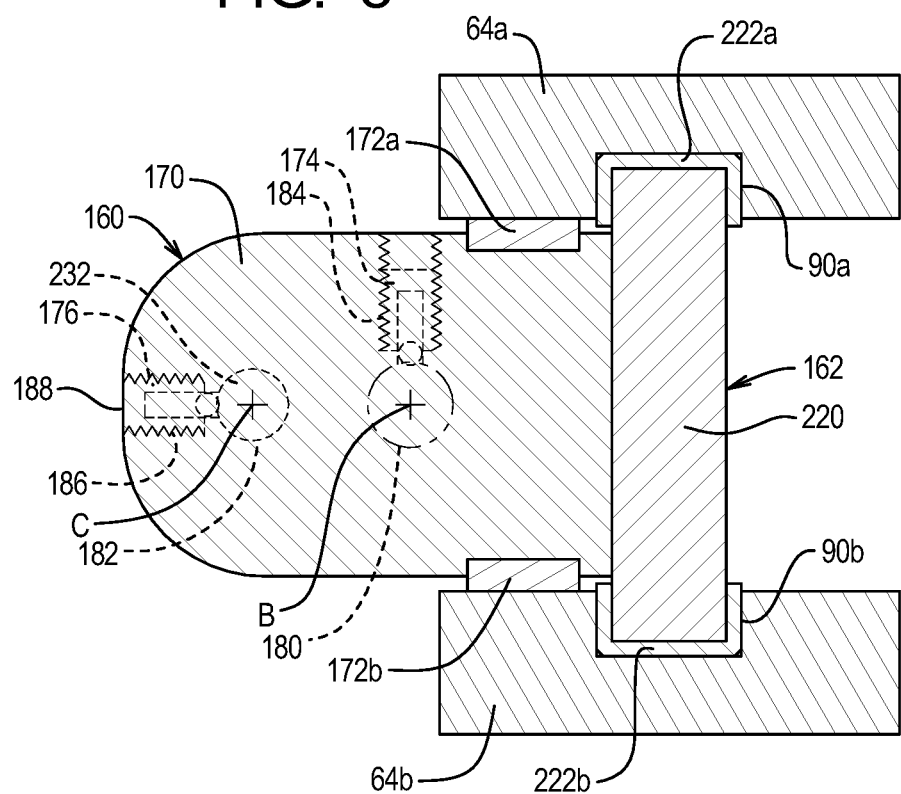
FIG. 8 is section view taken along lines 8-8 in FIG. 7.

The example guide plate assembly 162 comprises a guide plate 220 and first and second guide plate liners 222a and 222b. The guide plate 220 is rigidly connected to or integrally formed with the press plate 170 such that the press plate 170 and guide plate 220 move together during normal use of the offset press assembly 20. Further, the example guide plate 220 is arranged on an opposite side of the main drive cavity 180 from the offset drive cavity 182. During use, the edges of the guide plate 220 parallel to the drive axis B are covered by the plate liners 222a and 222b, and the liners 222a and 222b lie within the guide slots 90a and 90b, respectively, as shown in FIG. 8, such that the guide plate 220 is supported for linear movement along a path parallel to the drive axis B.

The first example removal head 164 comprises a base portion 230, a connecting portion 232, and a collar portion 234. An access notch 236 is formed in the collar portion 234, and a lock groove 238 is formed in the connecting portion 232. The second example insertion head 166 is an assembly comprising a base portion 240 having a connecting portion 242 and a collar portion 244. A bearing surface 246 is formed in the collar portion 244, and a lock groove 248 is formed in the connecting portion 242.

The drive assembly 54 may be any conventional system for creating linear movement of a force sufficient to remove or insert the wheel studs 24 as described in further detail below. The example drive assembly 54 comprises a drive body 250, a drive piston 252, a drive bearing 254, a drive projection 256, and a coupler assembly 258. The drive body 250 defines a drive chamber 260, and the drive piston 252 is arranged partly within the drive chamber 260 such that the drive piston 252 may be moved between retracted and extended positions with respect to the drive body 250. A threaded surface 262 is formed on the drive body 250, and a lock groove 264 is formed on the drive projection 256. The coupler assembly 258 is connected to the drive body 250 such that pressurized working fluid such as air may be introduced into the drive chamber 260 through a coupler port 270 to force the drive piston 252 from the retracted position to the extended position. The threaded surface 262 is configured to mate with the threaded portion 84 of the inner surface 80 of the top plate 60 to secure the drive assembly 54 relative to the frame assembly 50.

As mentioned above, the offset press assembly 20 may be used in different configurations depending upon whether a wheel stud is being inserted or removed and whether the wheel stud being inserted or removed is adjacent to no other wheel studs, a wheel stud on either side, or wheel studs on both sides. In particular, the adapter system 66 allows the offset press assembly 20 to be used in first, second, third, and fourth removal configurations (in either the loading or loading arrangements) or in a first example insertion configuration.

In preparation for use of the offset press assembly 20, the type and status of the wheel 26 and wheel stud 24 is first determined. Based on the wheel type (e.g., distance between stud hole and wheel cylinder), the guide plate 220 is first selected and detachably attached to the drive body 250 by inserting the drive projection 256 into the main drive cavity 180 such that the detent ball of the first lock assembly 174 engages the lock groove 264 in the drive projection 256. Next, based on whether the wheel stud 24 is to be removed or inserted, the removal head 164 or insertion head 166 is selected and attached to the guide plate 220. In particular, the connecting portion 232 of the removal head 164 or the connecting portion 242 of the insertion head 166 is inserted into the offset drive cavity 182 such that the lock groove 238 or lock groove 248 receives the detent ball of the second lock assembly 176, thereby detachably attaching the selected removal head 164 or insertion head 166 to the press plate 170.

Figure 12:
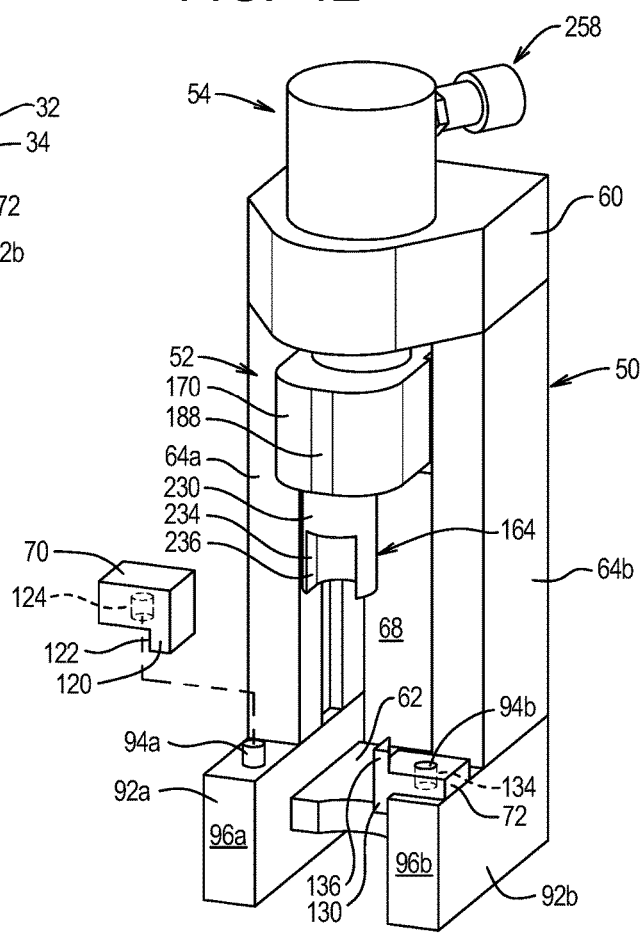
FIG. 12 is a perspective view of the example offset press assembly being arranged in a second removal configuration.
Figure 13:
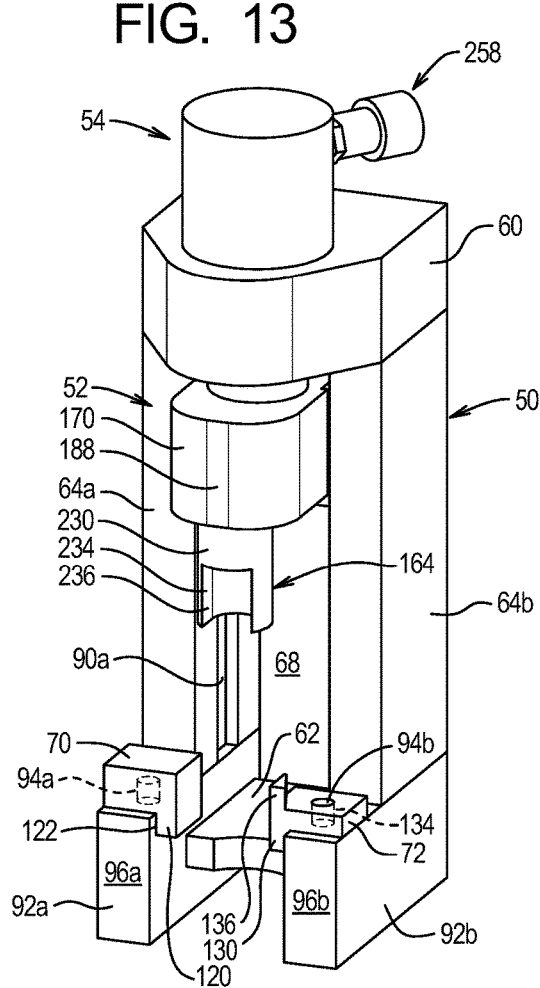
FIG. 13 is a perspective view of the example offset press assembly in a loading arrangement of the second removal configuration.
Figure 14:
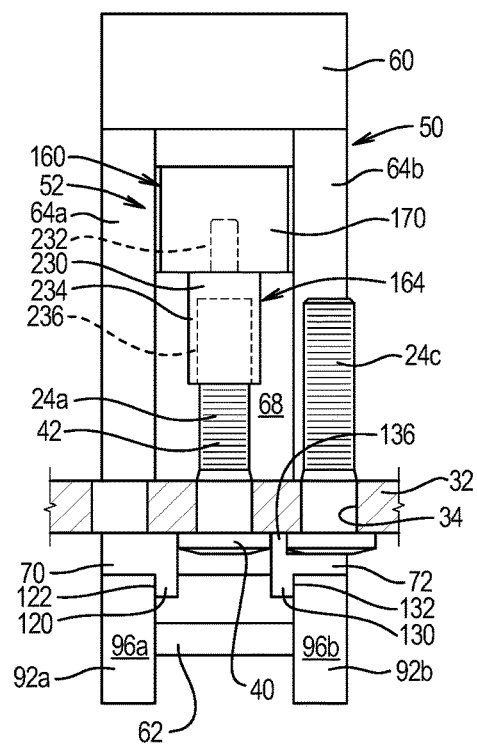
FIG. 14 a front elevation view depicting the example offset press assembly in a loaded configuration of the second removal configuration.
Figure 15:
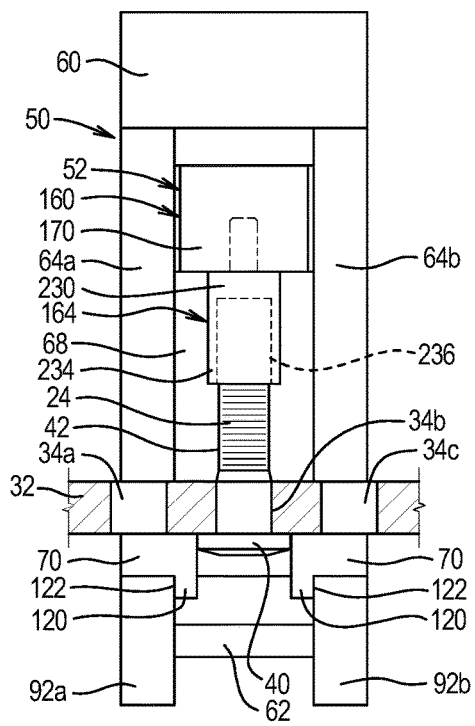
FIG. 15 a front elevation view depicting the example offset press assembly in a loaded configuration of a third removal configuration.
Figure 16:
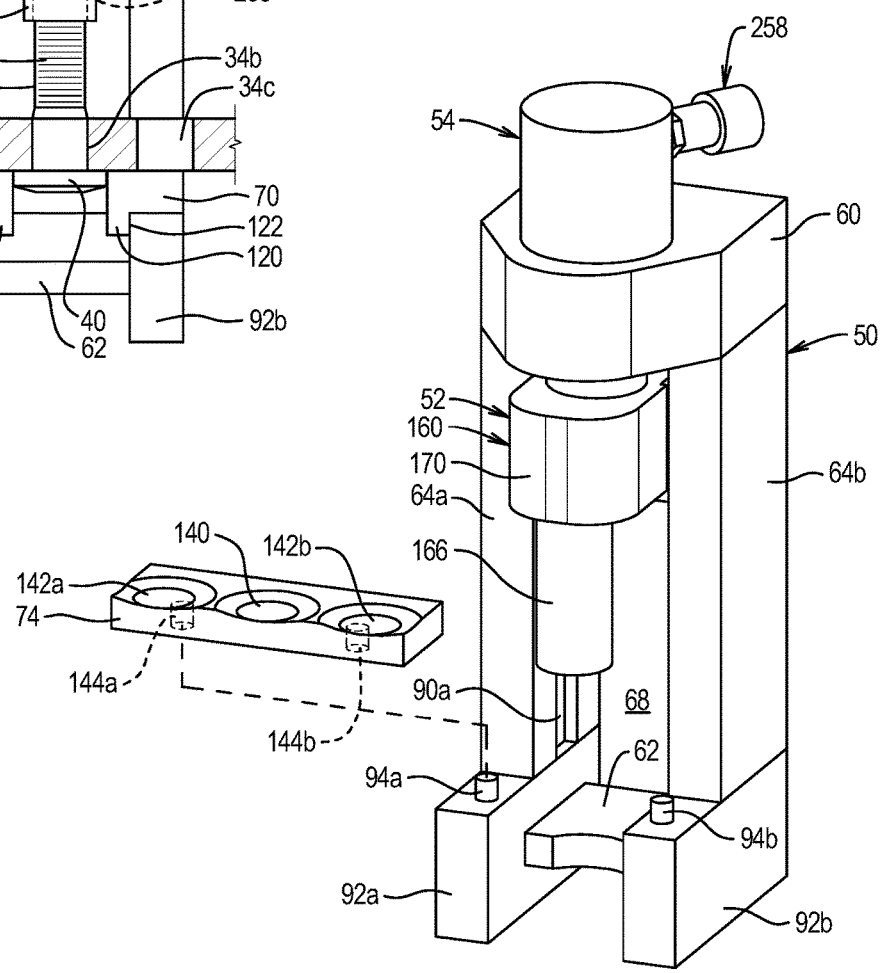
FIG. 16 is a perspective view of the example offset press assembly being arranged in a first insertion configuration.
Figure 17:
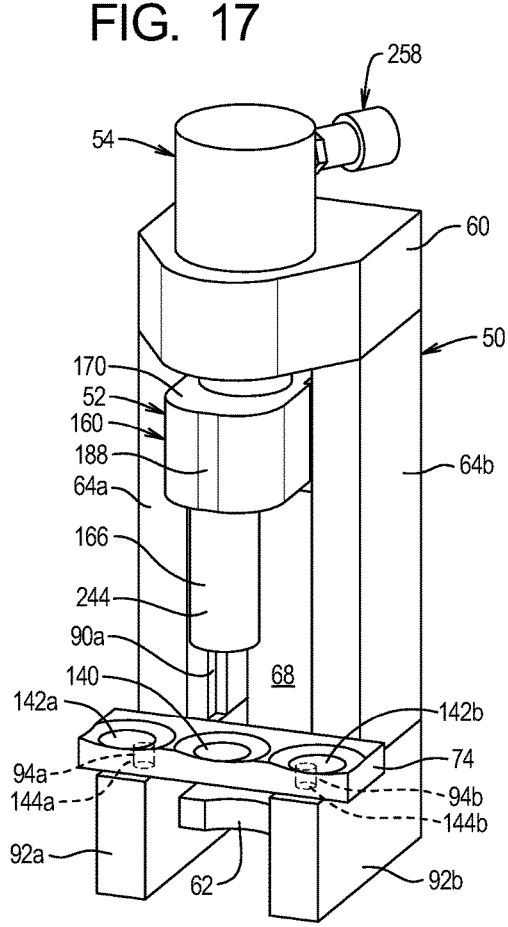
FIG. 17 is a perspective view of the example offset press assembly in the first insertion configuration.
Figure 18:
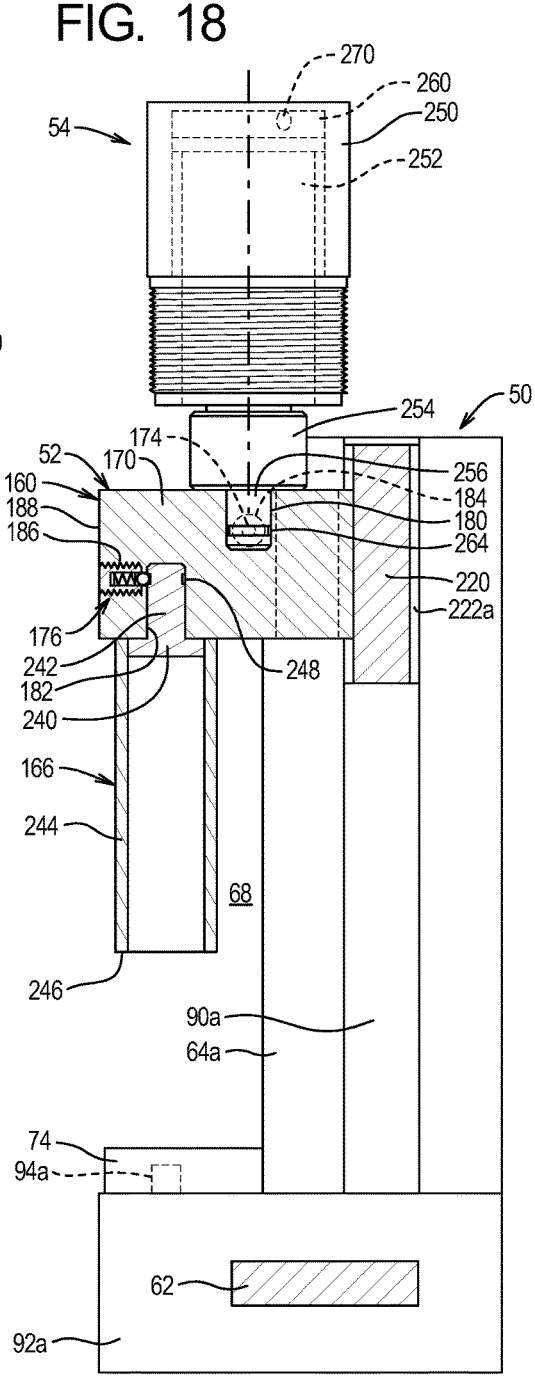
FIG. 18 is a side elevation, partial cut-away view of the example offset press assembly in the first insertion configuration.
Figure 19:
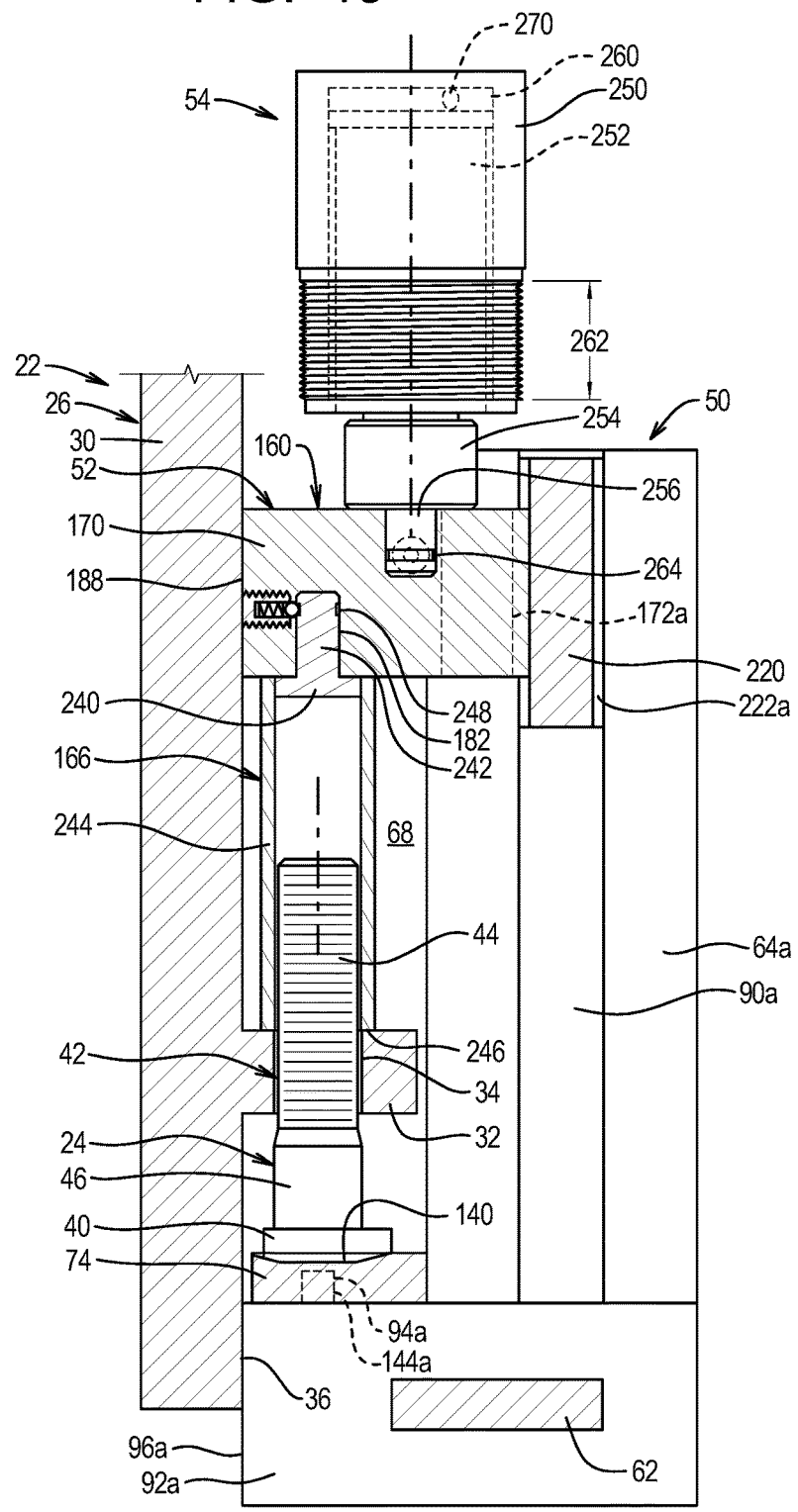
FIG. 19 is a side elevation, partial cut-away view of the example offset press assembly being used in the first insertion configuration to insert a wheel stud into a wheel.
Figure 20:
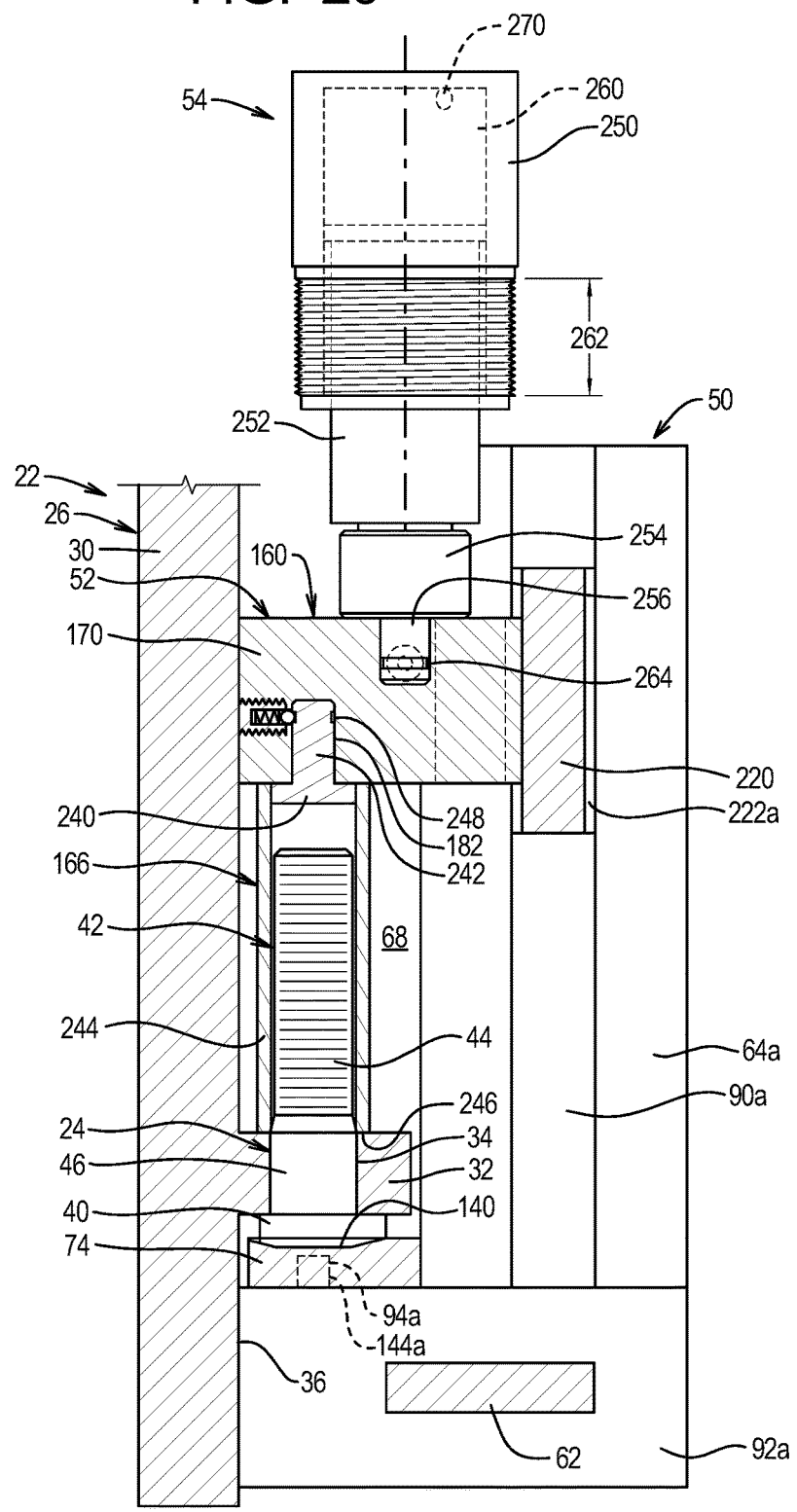
FIG. 20 is a side elevation, partial cut-away view of the example offset press assembly being used in the first insertion configuration to insert a wheel stud into a wheel.

The adapter system 66 is then used to configure the offset press assembly 20 as follows based on the wheel stud status (e.g., single wheel stud replaced, all wheel studs replaced). In the first removal configuration as shown in FIGS. 2-11, wheel studs 24b and 24c are present on both sides of the wheel stud 24a being removed. In this situation, the stud spacers 72 are supported by the adapter projections 94a and 94b on each of the foot portions 92a and 92b. In the second removal configuration as shown in FIGS. 12-14, a wheel stud 24c is present on only one side of the wheel stud 24a being removed. In this case, one of the stud spacers 72 is supported by the adapter projection 94b below the wheel stud 24c and a hole spacer 70 is supported by the adapter projection 94a. The example offset press assembly 20 is arranged in the third removal configuration (FIG. 15) when no wheel studs are present on either side of the stud being removed. In this case, one of the hole spacers 70 is supported by each of the adapter projections 94a and 94b. In a fourth possible removal configuration (FIGS. 21 and 22), wheel studs are located on either both sides or on neither side of the stud being removed (balanced).

As generally discussed above, the removal head 164 is used to place the offset press assembly 20 in a loading arrangement (FIGS. 4, 7, 13, and 21) and/or in an unloaded arrangement (FIGS. 5, 6, 9-11, 14, 15, and 22) when the offset press assembly 20 is in any of the insertion configurations. As perhaps best shown by a comparison of FIGS. 4 and 5, the removal head 164 is rotatable about its axis relative to the press plate 170. In the loading arrangement shown in FIG. 4, the removal head 164 is rotated such that the access notch 236 is facing away from the clearance slot 68 (towards the wheel stud to be removed). The offset press assembly 20 may then be displaced such that the wheel stud to be removed is within the collar portion 234 of the removal head 164 and the foot portions 92a and 92b arranged underneath the wheel flange 32. The removal head 164 is then rotated such that the access notch 236 is facing towards the clearance slot 68 (away from the wheel cylinder). The collar portion 234 thus inhibits removal of the offset press assembly 20 from its position on the wheel assembly 22.

At this point, the drive assembly 54 is operated to displace the drive piston 252 along the main drive axis B, thereby forcing the guide plate assembly 162 along the main drive axis B. The press assembly 52 is configured such that the guide plate 220 ensures linear movement of the press assembly even though the offset drive axis C is offset from the main drive axis B. The drive assembly 54 thus applies an effective force on the removal head 164 that displaces the removal head 164 towards the foot portions 92a and 92b along the offset drive axis C. Because the foot portions 92a and 92b are arranged below the wheel flange 32, the effective force applied to the removal head 164 drives the wheel stud 24 out of the stud opening 34 relative to the wheel flange 32.

The fourth removal configuration (FIGS. 21 and 22) may be used to remove a wheel stud under any balanced scenario of adjacent wheel studs: on both sides, or on neither side. In this situation, the removal head 164 is detachably attached to the press assembly 52 as described above. The removal brace plate 76 is arranged such that the adapter holes 154a and 154b therein receive the adapter projections 94a and 94b, thereby supporting the removal brace plate 76 on the foot portions 92a and 92b. The removal brace plate 76 is then arranged underneath the wheel flange 32, and the drive assembly 54 is operated to remove the wheel stud 24 as described above with reference to the first, second, and third removal configurations. The stud notch 150 prevents the removal brace plate 76 from interfering with movement of the stud 24 out of the stud opening 34.

The first insertion configuration (FIGS. 16-20) may be used to insert a wheel stud under any scenario of studs adjacent to the wheel stud being inserted. In this situation, the connecting portion 242 of the insertion head assembly 166 is detachably attached to the press assembly 52 using the second lock assembly 176 and the lock groove 248 formed in the connecting portion of the insertion head 166. The collar portion 244 is then arranged over the threaded portion 44 of the wheel stud 24. The base portion 240 is then received within the collar portion 244 to align the collar portion with the drive axis B. The insertion brace plate 74 is arranged such that the adapter holes 144a and 144b therein receive the adapter projections 94a and 94b, thereby supporting the insertion brace plate 74 on the foot portions 92a and 92b.

The shaft 42 of the stud 24 to be inserted is then inserted partly through the desired stud opening 34. The offset press assembly 20 is then arranged such that the center stud recess 140 of the insertion brace plate 74 is below the head 40 of the stud 24 to be inserted and the bearing surface 246 of the collar portion 244 of the insertion head 166 is above the wheel flange 32 and surrounds the desired stud opening 34. Operation of the drive assembly 54 displaces the insertion head 166 to move towards the foot portions 92a and 92b. Because the bearing surface 246 engages the wheel flange 32, the operation of the drive assembly 54 effectively presses the wheel stud 24 into the desired stud opening 34 until the head 40 of the wheel stud 24 comes into contact with the bottom surface of the wheel flange 32.

What is claimed is:

1. A press for displacing a first wheel stud relative to a stud opening in a wheel flange of a wheel, the press comprising:
    a press assembly defining an offset drive axis;
    a frame assembly comprising a frame member and at least one support member; and
    a drive assembly defining a main drive axis, where the drive assembly is configured to displace the press assembly relative to the frame assembly such that operation of the drive assembly displaces the first wheel stud relative to the wheel flange; wherein
    the frame member supports the press assembly and the drive assembly such that
        the press assembly moves along the offset drive axis relative to the frame member, and
        the offset drive axis is offset from the main drive axis; and
    the at least one support member is supported by the frame member and engages at least one of the wheel flange and a second wheel stud to support the press assembly in a desired orientation relative to the first wheel stud when the drive assembly displaces the first stud relative to the stud opening.

2. A press as recited in claim 1, in which the at least one support member is a hole spacer arranged to engage the wheel flange.

3. A press as recited in claim 1, in which the at least one support member is a stud spacer arranged to engage the second wheel stud.

4. A press as recited in claim 1, in which the at least one support member is a stud spacer arranged to engage the wheel flange and the second wheel stud.

5. A press as recited in claim 1, in which the frame assembly comprises first and second support members, where the first support member engages the second wheel stud and the second support member engages a third wheel stud to support the press assembly in the desired orientation.

6. A press as recited in claim 1, in which the frame assembly comprises first and second support members, where the first support member engages the second wheel stud and the second support member engages the wheel flange to support the press assembly in the desired orientation.

7. A press as recited in claim 1, in which the frame assembly comprises first and second support members, where the first support member engages the second wheel stud and the wheel flange and the second support member engages the wheel flange to support the press assembly in the desired orientation.

8. A press as recited in claim 1, in which the at least one support member is a removal plate, where the removal plate is configured to engage the frame member and the first wheel stud such that operation of the drive assembly removes the first wheel stud from the stud opening.

9. A press as recited in claim 1, in which the at least one support member is an insertion plate, where the insertion plate is configured to engage the first wheel stud and the press assembly engages the wheel flange such that operation of the drive assembly inserts the first wheel stud into the stud opening.

10. A press as recited in claim 1, in which:
the frame member comprises a top plate, a bottom plate, and first and second side walls;
the press assembly comprises a press plate, a guide plate, and a press head; whereby
the first and second side walls engage the guide plate such that the press assembly moves along a linear path relative to the frame member;
the press head defines an offset drive axis; and
the drive assembly defines a main drive axis; and
the frame member supports the drive assembly such that operation of the drive assembly causes the press head to move along the offset drive axis relative to the frame member, and
the offset drive axis is offset from the main drive axis.

11. A press as recited in claim 10, in which the press head is an insertion head.

12. A press as recited in claim 10, in which the press head is a removal head.

13. A press as recited in claim 1, in which the press assembly comprises a press plate and a press head, where the press head is rotatable relative to the press plate to facilitate engagement of the press head with the first wheel stud.

14. A press kit for displacing wheel studs relative to stud openings in a wheel flange of a wheel, the press kit comprising:
a press assembly;
a frame assembly comprising
 a frame member,
 first and second hole spacers,
 first and second stud spacers,
 a removal plate, and
 an insertion plate; and
a drive assembly configured to displace the press assembly relative to the frame assembly such that operation of the drive assembly displaces at least one of the wheel studs relative to the wheel flange; wherein
the press operates in
a first mode using the first and second stud spacers to remove one of the wheel studs;
a second mode using the first stud spacer and the first hole spacer to remove at least one of the wheel studs;
a third mode using the removal plate to remove at least one of the wheel studs; and
a fourth mode using the insertion plate to insert at least one of the wheel studs.

15. A press kit as recited in claim 14, in which:
the press assembly defines an offset drive axis;
the drive assembly defines a main drive axis; and
the frame member supports the press assembly and the drive assembly such that
 the press assembly moves along the offset drive axis relative to the frame member, and
 the offset drive axis is offset from the main drive axis.

16. A press kit as recited in claim 14, in which:
the frame member comprises a top plate, a bottom plate, and first and second side walls;
the press assembly comprises a press plate, a guide plate, and a press head; whereby
the first and second side walls engage the guide plate such that the press assembly moves along a linear path relative to the frame member;
the press head defines an offset drive axis; and
the drive assembly defines a main drive axis; and
the frame member supports the drive assembly such that operation of the drive assembly causes the press head to move along the offset drive axis relative to the frame member, and
the offset drive axis is offset from the main drive axis.

17. A press kit as recited in claim 16, in which the press head is at least one of a removal head and an insertion head.

18. A press kit as recited in claim 14, in which the press assembly comprises a press plate and a press head, where the press head is rotatable relative to the press plate to facilitate engagement of the press head with the first wheel stud.

* * * * *